(12) United States Patent
Umemoto

(10) Patent No.: US 6,470,334 B1
(45) Date of Patent: Oct. 22, 2002

(54) DOCUMENT RETRIEVAL APPARATUS

(75) Inventor: Hiroshi Umemoto, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/456,388

(22) Filed: Dec. 8, 1999

(30) Foreign Application Priority Data

Jan. 7, 1999 (JP) .......................................... 11-001921

(51) Int. Cl.⁷ ............................................... G06F 17/30
(52) U.S. Cl. ................................. 707/3; 707/1; 707/102
(58) Field of Search ............................. 707/5, 102, 2, 707/3, 1; 704/2, 9; 382/180

(56) References Cited

U.S. PATENT DOCUMENTS

| | | | | |
|---|---|---|---|---|
| 5,268,840 A | * | 12/1993 | Chang et al. ................... | 704/9 |
| 5,490,061 A | * | 2/1996 | Tolin et al. ...................... | 704/2 |
| 5,542,090 A | * | 7/1996 | Henderson et al. ............. | 707/2 |
| 5,625,553 A | * | 4/1997 | Kutsumi et al. ................ | 704/2 |
| 5,715,446 A | * | 2/1998 | Kinoshita et al. ............... | 707/5 |
| 5,745,899 A | * | 4/1998 | Burrows ....................... | 707/102 |
| 5,905,980 A | * | 5/1999 | Masuichi et al. ............... | 707/1 |
| 5,940,624 A | * | 8/1999 | Kadashevich et al. ....... | 359/759 |
| 6,076,086 A | * | 6/2000 | Masuichi et al. .............. | 707/3 |
| 6,275,610 B1 | * | 8/2001 | Hall, Jr. et al. .............. | 382/180 |

FOREIGN PATENT DOCUMENTS

| | | | |
|---|---|---|---|
| JP | 8-249346 | 9/1996 | ........... G06F/17/30 |
| JP | 8-249354 | 9/1996 | ........... G06F/17/30 |

\* cited by examiner

*Primary Examiner*—Charles L. Rones
(74) *Attorney, Agent, or Firm*—Oliff & Berridge, PLC

(57) ABSTRACT

The present invention provides a document retrieval apparatus that performs full text retrieval search on the documents by using an index of relatively smaller capacity for not only Indo-European documents but also Japanese documents in which the breakpoints of words are not clearly articulated. Every word contained in documents with the redundancy eliminated is stored in an index along with the information concerning the adjacent words adjoining to the words in the documents. When retrieving, based on the retrieval search criteria containing plural words and the sequential order thereof, word search parts determine whether plural words stored in the index matches the retrieval search criteria to identify if a document matches the criteria. Also the sequence of words may be restored from the index to output the appropriate full text of document.

8 Claims, 9 Drawing Sheets

FIG.1
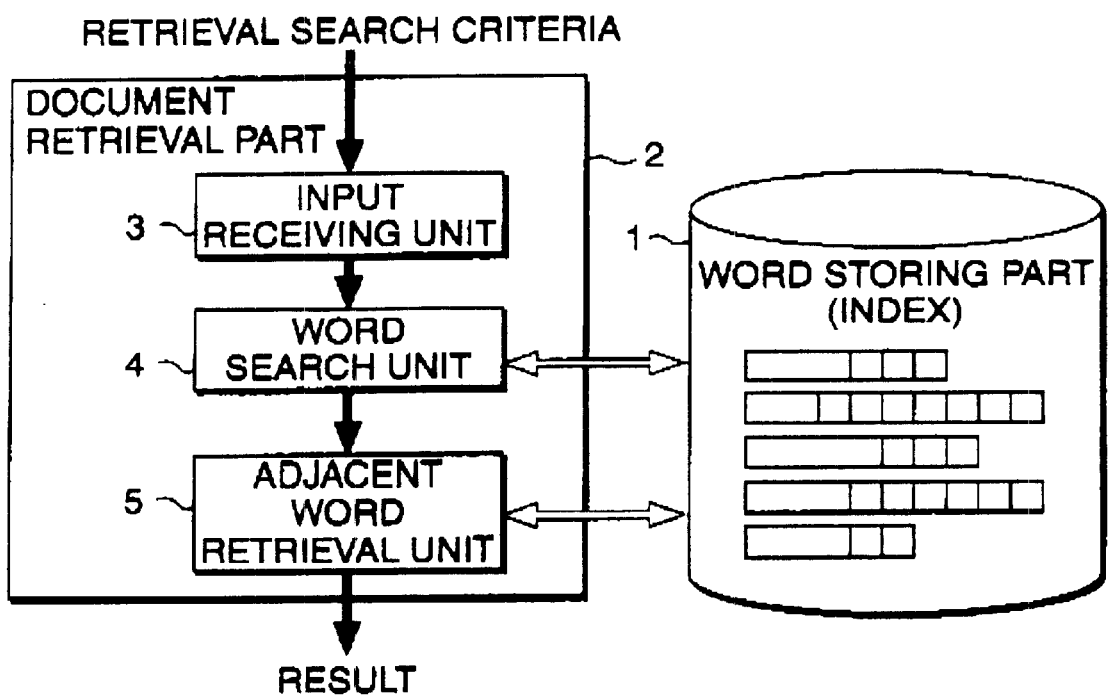
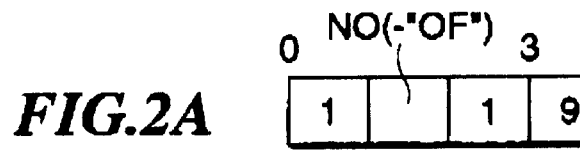
FIG.2A
FIG.2B
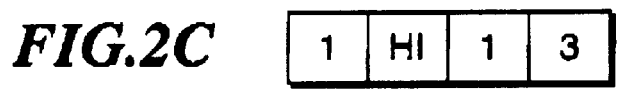
FIG.2C
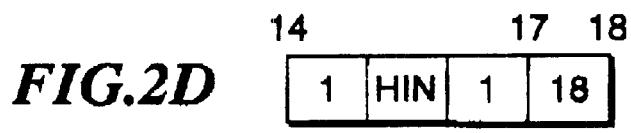
FIG.2D

FIG.10

| DOCUMENT | DOCUMENT SIZE (Bytes) | INDEX SIZE (Bytes) | SIZE RATIO |
|---|---|---|---|
| DOCUMENT A | 17,732 | 18,256 | 1.03 |
| DOCUMENT B | 16,108 | 19,414 | 1.21 |
| DOCUMENT C | 14,124 | 17,768 | 1.26 |
| DOCUMENT D | 9,588 | 12,646 | 1.32 |
| DOCUMENT E | 9,862 | 10,970 | 1.11 |
| DOCUMENT F | 18,174 | 20,124 | 1.11 |
| MEAN | 14,264 | 16,529 | 1.17 |

COMPARISON OF DOCUMENT SIZE WITH
INDEX SIZE IN ACCORDANCE WITH
THE PRIOR ART

FIG.11

| DOCUMENT | DOCUMENT SIZE (Bytes) | INDEX SIZE (Bytes) | REQUIRED MEMORY SIZE (Bytes) | SIZE RATIO |
|---|---|---|---|---|
| DOCUMENT A | 17,732 | 19,574 | 37,306 | 2.10 |
| DOCUMENT B | 16,108 | 18,162 | 34,270 | 2.13 |
| DOCUMENT C | 14,124 | 16,170 | 30,294 | 2.14 |
| DOCUMENT D | 9,588 | 11,430 | 21,018 | 2.19 |
| DOCUMENT E | 9,862 | 11,676 | 21,538 | 2.18 |
| DOCUMENT F | 18,174 | 20,316 | 38,400 | 2.12 |
| MEAN | 14,264 | 16,221 | 30,486 | 2.14 |

COMPARISON OF DOCUMENT SIZE WITH
INDEX SIZE IN ACCORDANCE WITH
THE PRIOR ART

EXAMPLE OF WORD-LOCATION INDEX
USING THE LOCATION OF WORD

EXAMPLE OF LOCATION-WORD
INDEX USING THE LOCATION OF WORD

FIG.14

| DOCUMENT | NO. OF BASAL WORDS | TRIAL SIZE OF BASAL WORD (Bytes) | NO. OF ADJACENT BASAL WORDS | ADJACENT WORD STORING AREA (Bytes) |
|---|---|---|---|---|
| DOCUMENT A | 590 | 5,704 | 6,276 | 12,552 |
| DOCUMENT B | 764 | 7,036 | 6,189 | 12,378 |
| DOCUMENT C | 755 | 6,996 | 5,386 | 10,772 |
| DOCUMENT D | 573 | 5,268 | 3,689 | 7,378 |
| DOCUMENT E | 504 | 3,854 | 3,558 | 7,116 |
| DOCUMENT F | 745 | 6,862 | 6,631 | 13,262 |
| MEAN | 655 | 5,953 | 5,288 | 10,576 |

CONTENTS OF INDEX SIZE IN ACCORDANCE WITH THE PRESENT INVENTION

DOCUMENT RETRIEVAL APPARATUS

BACKGROUND OF THE INVENTION

1. Field of the Invention

The present invention relates to a document retrieval apparatus, which rapidly retrieves documents including plural words in an order specified by its user by using a relatively small amount of index thereof.

2. Description of the Prior Art

There are known documents retrieval methods for retrieving required documents from within a large amount of documents. One well-known method registers the words included in these documents into an index prior to query-retrieval and uses this index to perform a faster retrieval task.

One example of such a method is retrieval of words from within plural documents. Thus an index is prepared in addition to documents in order to register every word appeared in the documents and pointers to the document that each word is contained in, prior to retrieval. When retrieving, by inputting a word as a retrieval condition, the pointer pointing to the document containing the input word is retrieved from the index to output the appropriate document.

In this method, however, all documents containing the word specified as a retrieval condition will be retrieved, resulting in a problem that many other documents not intended to be retrieved will be included in the retrieval result. Furthermore, narrowing the number of retrieved documents by querying the documents matching with plural words in the retrieval condition does not eliminate the above problem since the relationship between query keywords cannot be specified.

In the Japanese Published Unexamined Patent Application No. Hei 08-249346 discloses a document retrieval apparatus using an adjoining index, which indicates an order or keywords. In accordance with the document retrieval apparatus disclosed as above, a retrieval considering the relationships between two keywords input as query condition may be performed.

The above apparatus generally uses morpheme analysis technology, which has been developed in the field of natural language processing in order to extract words to be registered in an index from the documents to be processed. When using the concurrent morpheme analysis technology, a document may or may not be disassembled into the word strings in an accurate and univocal manner. For example, when performing morpheme analysis on the text "HIRO EN KAIJO GAI (outside banquet site)", there will be more than one result such as "HIRO | EN | KAIJO | GAI", "HIROEN | KAIJO | GAI", "HIRO | ENKAI | JOGAI", and "HIRO | ENKAIJO | GAI", where "|" designates to a break between two words. In such analysis, text strings may be split at different breakpoints for the same description.

In the index used in the document retrieval apparatus as described above, since adjoining words may be limited to only one, an index having the structure corresponding to the respective results of morpheme analysis should be provided, resulting in the index size being enormously large.

Japanese Published Unexamined Patent Application No. Hei 08-249354 discloses a document retrieval apparatus that stores the location of words in a document into the index. In accordance with this document retrieval apparatus, the resulting words may be registered together into an index, even if plural breakpoints are obtained for the same word or different word classes are presumed for this same string.

In this apparatus, there also arise the problem that the number of words to be registered in the index is so enormous that the amount of index cannot be ignored.

The above-described situation may be happen to any natural languages, but it is particularly noticeable in Japanese, in which the breakpoints between words are not clearly articulated when compared to Indo-European languages.

As can be seen from the above description, a document retrieval apparatus of the Prior Art for full text retrieval search using an index requires a large capacity of memory for loading a huge amount of index as well as a long time for index searching and therefore overall retrieval performance may be decreased, This problem may be significant for example in Japanese full text retrieval search, since breakpoints between words are not clear in Japanese. The number of words to be registered in the index will be larger in Japanese than that of Indo-European languages. If an index is to be arranged on a character basis rather than a word basis, in order to avoid the problem of the breakpoint of words, the number of entries to be registered in the index will be so large that the index size will be inflated.

SUMMARY OF THE INVENTION

The present invention has been made in view of the above circumstances and provides a document retrieval apparatus, which performs full text retrieval search of documents by using an index of relatively small amount of size for not only Indo-European documents but also Japanese documents in which breakpoints of words are not clearly articulated.

The present invention also provides a document retrieval apparatus that performs retrieval search, without registered data on the full text of documents, by only using the index by considering the relationship of words, and that outputs the reconstructed full text of documents based on the retrieval result.

The present invention further provides a document retrieval apparatus that stores information on the word class into a small size index, and perform fast retrieval search by using the comparison of the word class information. In other words, the present invention is to provide a document retrieval apparatus that performs fast retrieval search using the index storing the results of morpheme analysis on the documents in its relatively small size.

The document retrieval apparatus in accordance with the present invention has a word storing part that eliminates the redundancy of every word included in a document, and stores these words with additional information on adjoining words next to the word in the document, and a retrieval search part that determines, based on the retrieval criteria including plural words and the disposition of words, the correspondence of the retrieval criteria to plural words stored in the word storing part, in order to check to see whether or not a document matches with the retrieval criteria, i.e., whether or not a document containing the contents corresponding to the input criteria may be retrieved by the retrieval search.

More specifically, the word storing part constituting the index stores said every word by identifying its address in said word storing part, also stores said adjoining words immediately after the word, and additionally stores the addresses of stored adjacent words next to said adjoining words as information on said words in a predetermined order to indicate the word order in a document as the link of addresses in order to eliminate the redundant words to arrange an index of relatively small size.

The document retrieval apparatus in accordance with the present invention may be carried out in a variety of modes. As will be described in the following embodiments, the document retrieval apparatus in accordance with the present invention may be achieved by constituting the index in the word storing part as a trial form, by constituting the index commonly shared for every word in plural documents, by constituting the index so as to store two synonymous words of different forms between original and conjugated forms by connecting them with their addresses, or by storing words in the index with word class information being tagged so as for the document retrieval part to be able to determine the matching to the retrieval criteria based on the criteria including the word class information.

In the document retrieval apparatus in accordance with the present invention, a document output part outputs plural words determined to be matched by the document retrieval part in the order of tracing the addresses in the index so as to restore the documents matching the criteria.

In accordance with the present invention, full text of the documents retrieved may be restored and supplied without the provision of full text of registered documents other than the index, thus the amount of memory required for the full text of documents to be stored may be reduced.

The document retrieval apparatus in accordance with the present invention stores the information for specifying a document (pointer) and words included in the document into the document indexing part prior to retrieval search. When performing a retrieval search, the document identifying part identifies the documents containing all of the words included in the retrieval criteria from within plural documents stored in the document indexing part, based on the retrieval criteria having plural words and the order thereof. Then a document retrieving part uses the corresponding words storing part to perform a retrieval search on the set of documents matching to the plural words and the order thereof included in the retrieval criteria, from within the set of documents obtained from the document identifying part.

When an index (word storing part) is made for each of plural documents or of plural document sets, the documents matching to the retrieval criteria may be identified. The retrieval search will be efficiently achieved since the retrieval search is performed by using the index corresponding to these identified documents.

The present invention may be carried out by executing on a computer the program achieving the functionality of document retrieval apparatus as described above. More specifically, the index as described above may be stored on a storage medium such as CD-ROM and installed or accessed by a computer for the full text retrieval search as described above.

It is anticipated that the retrieval result will be as intended by the searcher if the relationship between words or the grammatical role can be considered at the time of retrieval search.

In order to perform a retrieval search while considering the relationship between words, the pointer to the document where a word appears and the location of a word in the document should be registered in the index. When performing a retrieval search, the pointer to the document that satisfies the retrieval criteria may be identified from the index by receiving the plural words and the relationship thereof as the retrieval criteria.

When simply implementing such a method as above, a large index will be needed in addition to the full text of the documents. If a document is to be identified based on a word, it will be sufficient to maintain a pointer to the document for each of different words in the document. However, if the document and the location where a word appears in that document are to be identified based on a word, it will be required to maintain the location of the word appeared in the document in addition to the pointer to the document for each word appeared in the document.

In this point of view, the present invention retrieves, restores and outputs the appropriate document without having full text data of the document, so as to prevent the index from being larger due to the extensive quantity of pointers, as is the case cited above.

It may be considered that the documents in which breakpoints between words are not clear such as Japanese documents can be retrieved by building an index on a character basis, instead of a word basis. For example, words have to be registered in the index for identifying the document and the location of the character in the document based on the character string. More specifically, by providing an index in addition to the full text of documents, every character appeared in the documents, the pointer to a document in which a character appears, and the location of the character in that document should be registered as a set. A retrieval search is performed by receiving a character string as the retrieval criteria, and determining the pointer to the document that contains each character constituting the character string in a specified order of appearance of the characters.

When simply implementing such a method as above, the size of a needed index will be extensively large. this is because the total number of characters in a document is much larger than the number of different words or the total number of words, and a total amount of information about the location of words in a document is especially increased.

In this point of view, the present invention builds a word-based index, so as to prevent the index from being large as is the case cited above.

In addition, the use of morpheme analysis allows words in a document to be extracted, albeit breakpoints of the words in the document are not clearly articulated such as in Japanese document, as well as it allows information on the word class for each of words to be added to the index. By doing this, the index may be readily generated and the retrieval search using the index may be performed faster.

In the case where the morpheme analysis technology is used, a document may or may not be disassembled into the word strings in an accurate end univocal manner. As shown in the example of document "HIROENKAIJOGAI (outside banquet site)" cited above, words may be split at different breakpoints for the same description. Therefore if an index is created by simply making use of the result of morpheme analysis, the number of different words for the same text string will become enormous, the size of the index also will become corpulent, and the index search using this index will become slower.

In the case where there are not registered as many words as the case above into the index, if a searcher desires an index search using some words, there will occur a discrepancy between the word intended by the searcher and the word registered in the index of the retrieval search system. For example, when the searcher wishes to search and retrieve a document containing the string "coffee beans with sucked dregs", the searcher intends that the "sucked dregs" is the word of search criteria whereas the retrieval search system may have "suck" and "dreg" registered in the index. Conversely, the searcher specifies "dreg" as the search word whereas the retrieval search system may have only "sucked dregs" registered in the index. In both cases, the search fails to prevent the appropriate document from being retrieved correctly.

In this point of view, the present invention may generate the index by maintaining the order of words while eliminating the redundant words so as to be able to register as many words as possible in the index of smaller size in order to perform faster index search as well as to achieve a complete, error-free retrieval search as intended by the searcher.

By performing the morpheme analysis, not only may a document be split into component words but also the word class may be presumed.

However, the presumed word class may or may not always be correct and univocal. For example, in the document containing "coffee beans along with sucked dregs", "sucked" can be presumed to belong to the noun "suck" as well as to the verb "suck". It is preferable that the retrieval search hits to the above document when the searcher specifies in the criteria the word "suck", which is not explicitly included in the document.

In this point of view, the present invention may generate an index by maintaining word class information in a relatively smaller size, so as to be able to perform index search as intended by the searcher, by using information of plural different word classes about the word in the same text string.

BRIEF DESCRIPTION OF THE DRAWINGS

The following description of preferred embodiments of the present invention may be best understood by reading carefully with reference to the accompanying drawings, in which:

FIG. 1 is a block diagram showing a document retrieval apparatus of a first preferred embodiment in accordance with the present invention;

FIGS. 2A–2D are schematic diagrams showing the index structure of the first embodiment in accordance with the present invention;

FIG. 10 is a table showing the comparison of size data in accordance with the present invention;

FIG. 11 is a table showing the comparison of size data in accordance with the Prior Art;

FIG. 14 is a table showing the detailed data or the size in accordance with the practice of the present invention.

DETAILED DESCRIPTION OF THE PREFERRED EMBODIMENTS

Figure 3:
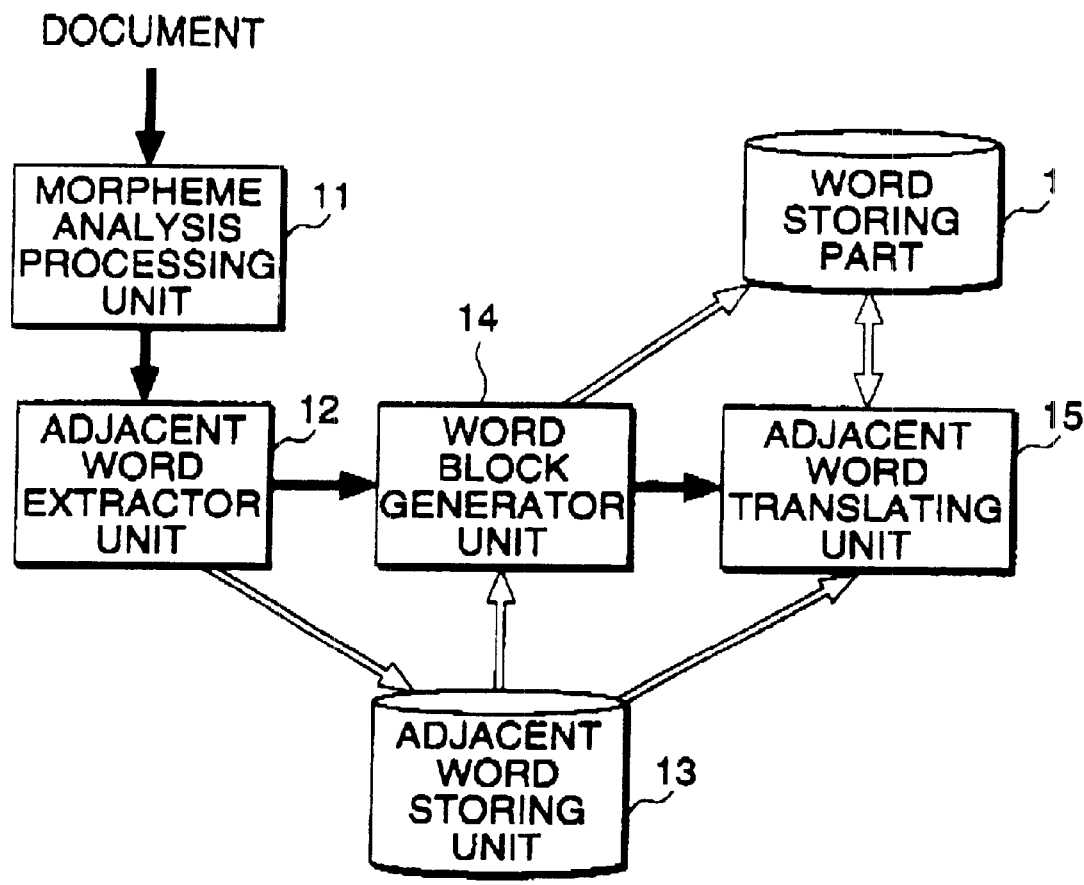
FIG. 3 is a schematic diagram showing an index generator.

A detailed description of some preferred embodiments embodying the present invention will now be given referring to the accompanying drawings.

In the following preferred embodiments, Japanese documents will be subjected to the retrieval search, however, the present invention may be applied not only to the Japanese documents, but also to documents in a variety of languages, such as English, French, Chinese, and Korean.

Also in the following preferred embodiments, function parts constituting the document retrieval apparatus in accordance with the present invention will be achieved by performing a program on a computer, however, in accordance with the present invention, the required function parts may be built as a proprietary device.

In accordance with the present invention, the index (word storing part) maybe automatically generated in a memory such as a hard disk by using the result of morpheme analysis by a computer, the index data may also be generated in advance and stored in a recording medium such as CD-ROM so as to be read by another computer to install in the computer or access to the index data in order to build a document retrieval apparatus using the index.

First Embodiment

Now referring to FIG. 1, there is shown a block diagram showing a document retrieval apparatus of a first embodiment in accordance with the present invention.

The document retrieval apparatus of this embodiment has, as its primary elements, a word storing part 1 having a memory storing the index in a readable/writable manner, and a document retrieval part 2 performing the full text retrieval search using an index 1 in response to the search criteria input from a searcher.

The structure of the word storing part 1 will be now described in detail. The word storing part 1 maintains as many blocks as the words appeared in a document in the ascending order of the word blocks, a block being constituted of a word and information about that word. An address is assigned to each block in the word storing part 1, reverse reference from an address to the corresponding block and the word may be performed. The information about a word includes the data length of that word, the total number of words following that word, and the address of the adjacent word address unit in the block of the word following that word, The adjacent word address further contains the address of a word succeeding to the word following that word. For example, assuming a string of words "A, B, C", the adjacent word address of the block A indicates the adjacent word address storing unit of the block B. The adjacent word address storing unit of the block B indicates the adjacent word address storing unit of the word block C. The information about these words is expressed in fixed length binary data.

More specifically, FIG. 2 shows an example of the structure of the word storing part (index structure) with respect to a document "KINENBI NO KINENHIN (souvenir of anniversary)". In this figure, a row corresponds to one block, a rectangle designates to a data area, the number at the upper left corner of rectangle designates to the address of that rectangle area.

A block is constituted of the data length of the word, the text string of the word, the total number of adjacent words, and the address of the adjacent words, in this order. In this example, components of one character word and components other than the text string are expressed as length 1.

In the index shown in FIG. 2, the blocks of address 0 to address 3 indicates that the word is "NO-"OF"" with word data length 1, that the number of adjacent words succeeding to the word "NO-"OF"" is one, and that the adjacent word address storing unit contains the address 9. The address blocks 4 to 9 including the adjacent word address 9 indicates that the word is "KINEN" with the word data length 2, that the number of adjacent words succeeding to the word "KINEN" is 13, and that the adjacent word address storing unit contains the address 17. The address blocks 14 to 17 including the adjacent word address 17 indicates that the word is "HIN" with the word data length 1, that the total number of adjacent words succeeding to this word "HIN" is 1, and that the adjacent word address storing unit contains the address 18.

By tracing the links between these adjacent words, word blocks "NO-"OF"", "XINEN", "HIN" can be retrieved, and based on the order of word blocks a document "NO-KINENHIN" may be restored.

It should be noted here that in the word "HIN", which is placed at the end of the document, the adjacent word address unit contains the address 18, indicating that this is the end of the document.

The document retrieval part 2 further has an input receiving unit 3, a word search unit 4, and an adjacent word retrieval unit 5 for performing the retrieval search as described below.

When the input receiving unit 3 receives plural words input from the searcher with the order specified as the retrieval search criteria, the word search unit 4 searches the word on top of the retrieval search criteria from within the word storing part 1. If the target word exist in the word storing part 1, then the adjacent word retrieval unit 5 searches the second word in the retrieval search criteria from among the adjacent words succeeding to the word registered in the word storing part 1. The above process will be iterated for every word in the retrieval search criteria, to determine whether or not all words from top to the end of the retrieval search criteria exist in the word storing part 1 in that order and in succession to display finally the retrieval search result as "search hit" or to restore and output the original document as will be described later.

Now assuming that another retrieval search criteria with words "NO-"OF", KINEN, HI" for example is supplied to the index (word storing part) 1 as shown in FIG. 2. Then the system searches the word "NO-"OF"" from within the word storing part 1, and determines that the word "NO-"OF"" exists therein. Thus only one address 9 of the adjacent word succeeding to the word "NO-"OF"" can be retrieved from the index.

When reverse referencing the word in the address 9 from the index 1, the word stored on the top of the index is "NO-"OF"" with data length 1, with only one adjacent word. The beginning address of the next block may be determined as 4, by summing the beginning address of this block (0), the data length (1), the data length of the word string (1), the length of total number of adjacent words (1), and the data length of the adjacent word addresses (1×1).

The possible address range of the block corresponding to the word "NO-"OF"" may be greater than 0 and less than 4, consequently the word in address 9 is out of range. when performing the same calculation as above on the next word "KINEN", the possible address range of this word may be greater than 4 and less than 10, with a result that the word in address 9 will be this word.

As the word "KINEN" is the second instance in the retrieval search criteria, the system continues to process as similar to the process described above for this word. As in this address 9 the number 17 is stored, the word "HIN" may be determined by the reverse referencing from this address. However, this does not satisfy the retrieval search criteria. As the index 1 contain no entry of word "NO-"OF"" other than this word, this document registered in the index will be determined not to comply with the retrieval search criteria.

Now the process constituting the word storing part (index) 1 will be described below in detail.

Referring to FIG. 3, there is shown a schematic diagram showing the structure of a device for building the index 1. This device may be provided integrated to the document retrieval apparatus as described above, or it may be provided separately as a proprietary device for building the index to be provided to the document retrieval apparatus by storing the created index on a recording medium or by transmitting via a telecommunication line.

When a document to be registered as data is input, a morpheme analysis processing unit 11 performs morpheme analysis on this document.

Then, an adjacent word extractor unit 12 extracts sequentially words from the result of morpheme analysis, and iterates following processing on every morpheme analysis result. In the following description the word extracted sequentially from the morpheme analysis result will be referred to as "basal word".

If a basal word is not yet stored in an adjacent word storing unit 13 having a memory, this basal word will be stored in the adjacent word storing unit 13. Then by searching the locations of that basal word in the document the succeeding word appeared in the document will be extracted. Hereinafter, the neighboring word appeared immediately succeeding to a basal word will be referred to as "adjacent word". The number of adjacent words corresponding to the adjacent word may be determined from the adjacent word storing unit 13.

If on the other hand that adjacent word is not yet stored in the adjacent word storing unit 13, then this adjacent word will be stored in the adjacent word storing unit 13.

Next, a pair of a determined number of adjacent words and the adjacent word will be stored in the adjacent word storing unit 13 so as to be related to its basal word, and the number of adjacent word of the basal word will be incremented by one. In the following description, the pair of total number of adjacent words and the adjacent word will be referred to as "adjacent word information".

As can be seen from the above description, the adjacent word storing unit 13 stores the basal words as keys, and the set of adjacent words information as values.

A word block generator unit 14 creates blocks for all the basal words stored in the adjacent word storing unit 13 to store in the word storing part 1. It should be noted that an area for storing the set of adjacent word block corresponding to the basal word will be reserved in advance, immediately after basal word blocks.

In the basal word blocks in the word storing part 1, the address of block indicating a basal word may be uniquely defined. In the following description, the block address indicating a word will be referred to as "word address". The word address may be expressed in the word storing part 1 as amount of fixed length, which amount will be referred to as the word address length.

The adjacent word translating unit 15 exhibits an adjacent word stored in the adjacent word storing unit 13 by adding the word address to the value of product of the word address length with the number of adjacent words. This value will be referred as adjacent word address herein. In the word storing part 1 the adjacent word address will be stored immediately after the node indicating its basal word.

Consequently, in the word storing part 1, every word from the result of morpheme analysis of documents to be registered will be registered in a manner in which the sequential order in the original document is presented without redundancy, as shown in FIG. 2.

Second Embodiment

A second embodiment in accordance with the present invention will be now described in detail. As this second embodiment is different from the first embodiment above in the structure of word storing part (index) 1, the section characterized in the second embodiment will be described, and the section identical to the first embodiment will be omitted.

The word storing part 1 stores every word appeared in a document in a trial form without redundancy, and maintains its adjacent word address immediately after the terminating node of each word.

Figure 4:
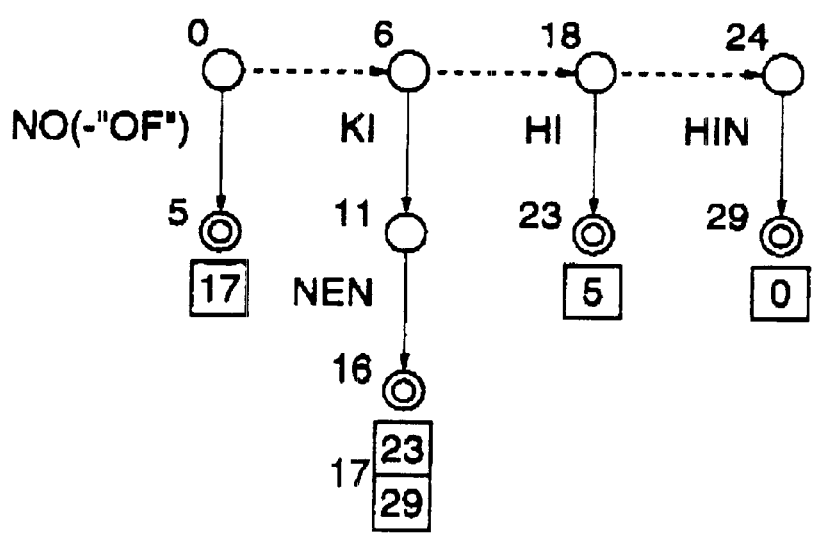
FIG. 4 is a schematic diagram showing one example of the index structure in accordance with a second embodiment of the present invention.

Now referring to FIG. 4, there is shown an exemplary structure of the index 1 which corresponds to the document "KINENBI NO KINENHIN (souvenir of anniversary)".

In the drawing, a single circle designates to a node not being terminated, a double circle designates to a node being terminated, an arrow with solid line to an arc in the direction of depth, an arrow with dotted line to an arc in the horizontal direction, Hiragana and Chinese character in the left of are to a label, the number at upper left corner of node to the location (address) of node in the word storing part 1, a rectangle at the bottom of the terminated node to an area for storing adjacent word address, the number in the rectangle to the adjacent word address, respectively. It should be noted that the adjacent word address 0 indicates that there is no adjacent word that succeeds thereto and the document is terminated at this point. Here the pair of an arc and a node has length 5, and a word address has length 1.

Figure 5:
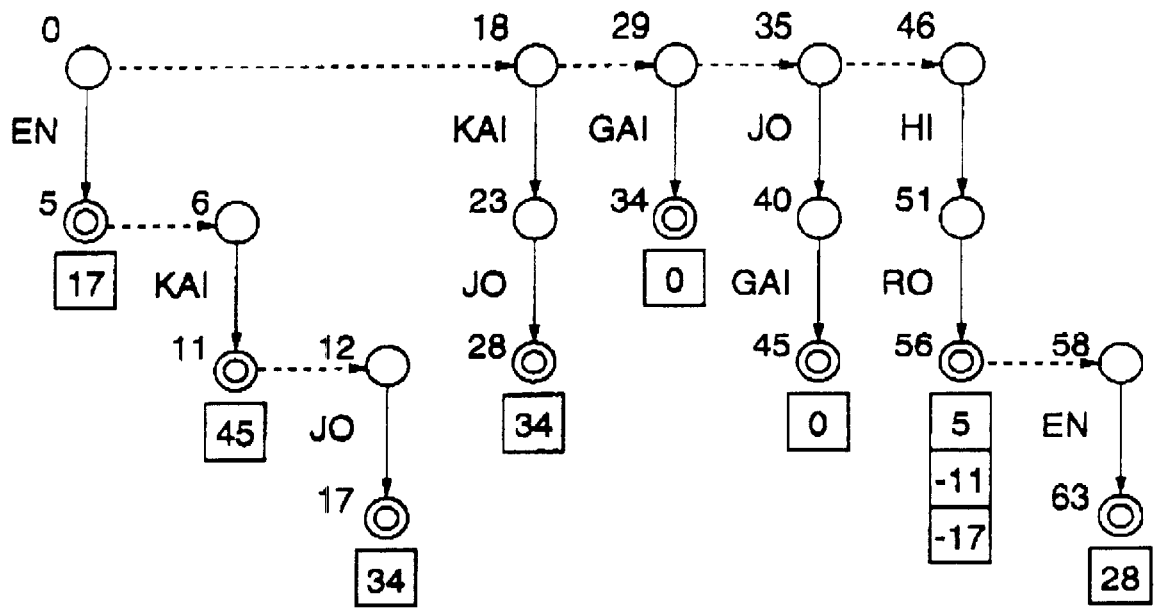
FIG. 5 is another schematic diagram showing one example of the index structure in accordance with the second embodiment of the present invention.

Now referring to FIG. 5, there is shown the structure of the index 1 which corresponds to the document "HIROEN-KAIJOGAI (outside banquet site)".

In the example shown in FIG. 5, it is assumed that four results "HIRO | EN | KAIJO | GAI", "HIROEN | KAIJO | GAI", "HIRO | ENKAI | JOGAI", and "HIRO | ENKAIJO | GAI" have been obtained from the morpheme analysis of the original document. An adjacent word address with the negative symbol indicates that the adjacent word appeared at the same location as the previous adjacent word appeared in the document, and that adjacent word address itself indicates its absolute value. For example if adjacent word addresses in sequence "5, −11, −17, 28, 34" are stored immediately after a basal word, the adjacent words "5", "11" and "−17" appear at the same location in the original document, the adjacent words "17", "28" and "34" appear at the different location in the original document.

In the retrieval search using the index 1 described above, similarly to the first embodiment, the document retrieval part 2 receives from a user the retrieval search criteria to determine whether or not the document registered in the index 1 matches with the retrieval search criteria.

More specifically, when the input receiving unit 3 receives as retrieval search criteria a sequence of plural words (referred to as search word), the word search unit 4 seeks from the index 1 the word address ranges that each search word can occupy for every search word. The address range that a word can occupy may be referred to as word address range.

Then, the adjacent word retrieval unit 5 seeks the adjacent word address that is disposed within the word address range of a second search word from the adjacent word address or top search word to determine, in the case where the appropriate adjacent word address exists, whether or not the adjacent word address at the location that the adjacent word address is stored (referred to as matching candidate location hereinbelow) is disposed within the word address range of a third search word. If the process result is true, then the adjacent word address pointed to by that adjacent word address is determined whether or not to be disposed within the word address range of a fourth search word.

The process as mentioned above will be iterated to the last search word and if all the results to the last one are true, then it is determined that the matching candidate location matches with the retrieval search criteria input from the user, therefore the document matching to the search criteria is determined to be registered in the index 1.

For example, if a retrieval search criteria with a sequence of words "KINEN" and "HIN" is input with respect to the index 1 shown in FIG. 4, then the system seeks the search word "KINEN" from within the index to retrieve the word "KINEN" occupying the address 6 to 17.

In the adjacent address of this word "KINEN" are stored 23 and 29, the address 23 connects to a word "HI" while the address 29 connects to a word "HIN". Since the latter candidate matches a second search word "HIN", it will be determined that a document matching to the retrieval search criteria "KINEN" and "HIN" is registered in the index 1.

This method of storing a set of words in the index in a trial form is widely accepted for locating search words from extensive documents. When comparing with the method of storing words in table form as have been described in the word storing part 1 of the first embodiment, this trial form has advantages that it requires smaller amount of memory and that it may perform faster retrieval search. This trial form may reduce the required capacity of memory when compared with the table form because strings at the beginning commonly shared by several words are stored as one single data block. This effect increases as the number of word increases. At the time of searching, the trial form also has an advantage that it performs significantly faster retrieval search than the table form by skipping searching the words that the beginning strings are not matching the target word, while on the other hand the table form requires a relatively long period of time, proportional to the total number of words in the table, for searching the target word, since the table form needs to sequentially seek and match from the top of the table to the target one by one.

Accordingly the second embodiment advantageously requires a smaller capacity of memory and less time for searching as compared with first embodiment.

Third Embodiment

Now third embodiment in accordance with the present invention will be described in detail below. The present embodiment is characterized in that it stores in the word storing part 1 not only the adjacent words appeared immediately after the basal words but also the adjacent words appeared immediately before the basal words. The detailed description of the elements similar or identical to the preceding second embodiment will be omitted.

The adjacent words appeared immediately before the basal word will be referred to as preceding adjacent words, and the adjacent words appeared immediately after the basal words will be referred to as succeeding adjacent words, for identifying the relationships.

Figure 6:
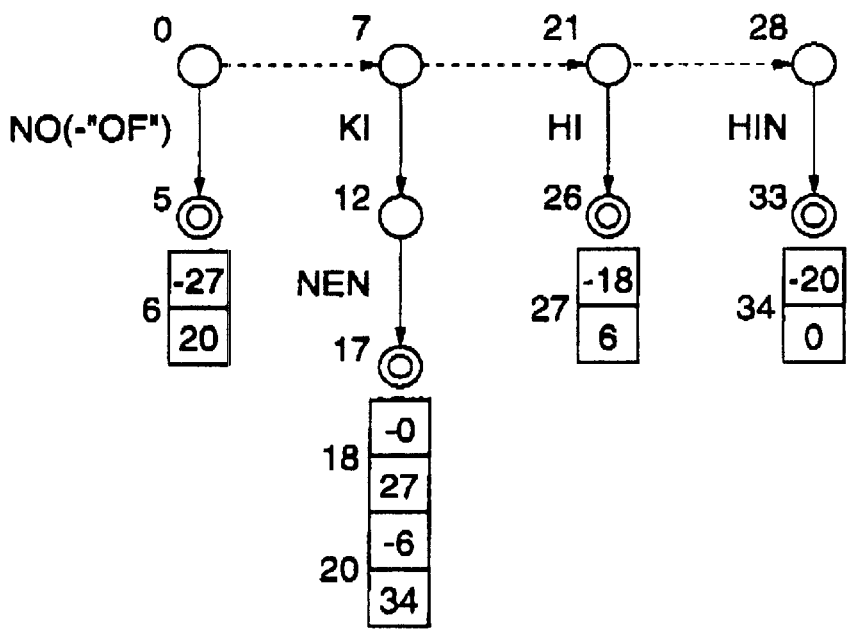
FIG. 6 is a schematic diagram showing one example of the index structure in accordance with a third embodiment of the present invention.

Now referring to FIG. 6, there is shown the structure of the index 1 which corresponds to a document "KINENBI NO KINENHIN (souvenir of anniversary)". In this example, a negative adjacent word address indicates a preceding adjacent word of which the absolute value of the address is the adjacent word address.

For example, in this example, the address 27 of a preceding adjacent word and the address 18 of a succeeding adjacent word are incorporated to the word "NO-"OF"". In other words, the sequence of words "HI-NO-OF-KINEN" is registered into the index 1 because the word "HI" corresponding to the address 27 is prefixed and the word "KINEN" corresponding to the address 18 is suffixed to the word "NO-"OF"".

Fourth Embodiment

Now a fourth embodiment in accordance with the present invention will be described in detail below. This embodiment is characterized in that when a conjugation of a basal word, which is different from the antetype, appears in a document, it stores in the word storing part 1 the conjugation in addition to its antetype. In this example, a detailed description of the elements similar or identical to preceding second embodiment will be omitted.

Figure 7:
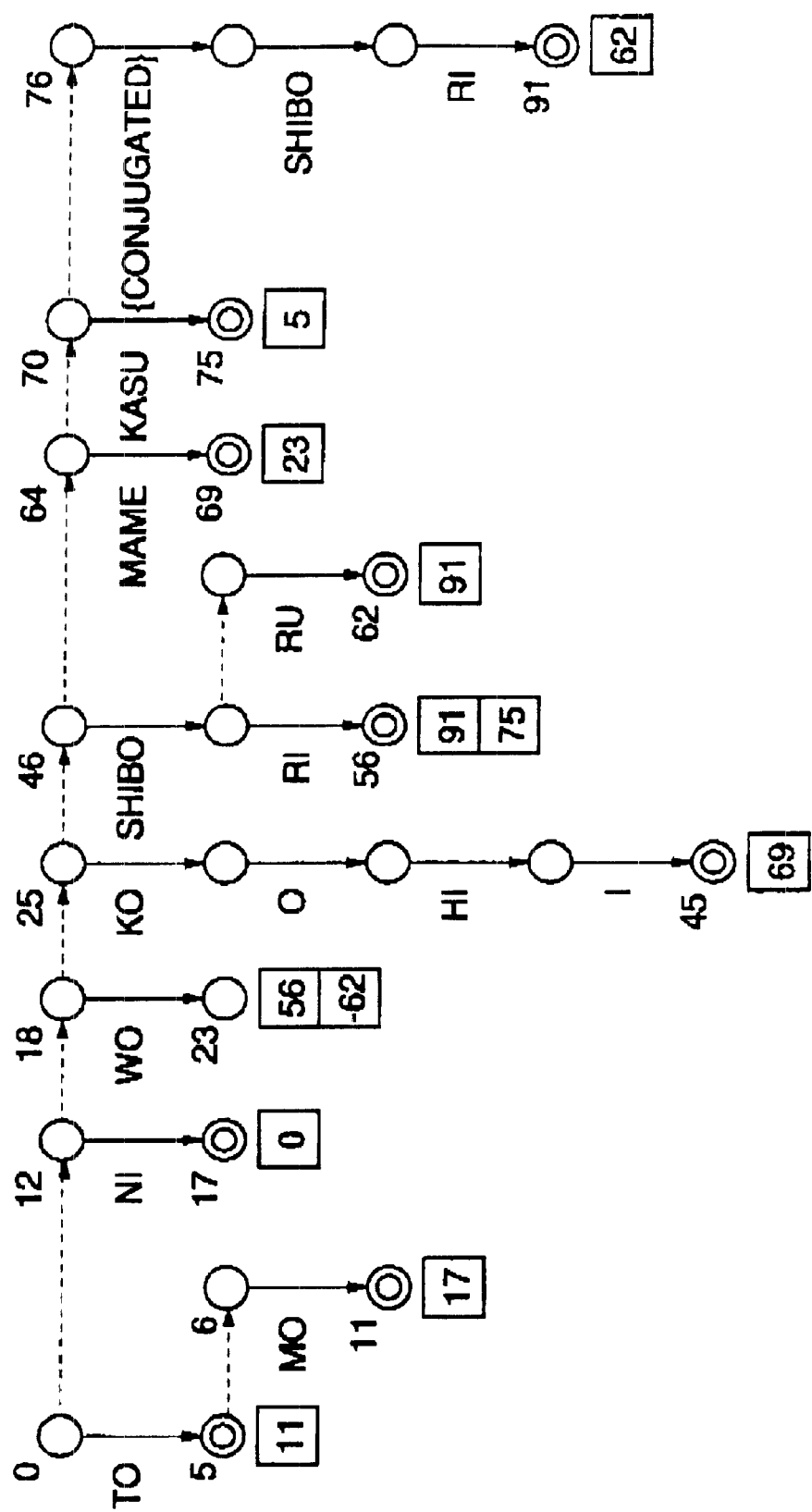
FIG. 7 is a schematic diagram showing one example of the index structure in accordance with a fourth embodiment of the present invention.

Now referring to FIG. 7, there is shown the structure of the index 1 which corresponds to a document containing "coffee beans along with the sucked dregs". In this example labels {conjugated} are tags for indicating that the conjugated form of basal words appears in the document. The original form of a basal word is stored immediately after the conjugation of the basal word. The conjugated form of basal word is stored in the original form of basal words having the conjugated form. When registering a word in the index, if the word is stored in the original form, then the conjugation will be stored immediately after the original form, or if the word is stored in the conjugated form, then the original form will be stored immediately after the conjugated form.

When building the word storing part 1 in a manner as described above, sub-trial may be performed on the conjugated form of basal words. In other words, the word address range of the basal words in conjugated form may be defined.

For example, in the example shown in FIG. 7, when retrieval searching the word storing part 1 with the keyword "suck", the word "suck" in the original form may be obtained. If searching the word storing part 1 with the same keyword with the tag of the conjugated form being added, the conjugated form "sucked" may also be obtained. The conjugated form "sucked" contains the word address 62 of this conjugated form, the original form "suck" in the word address 62 contains the word address 91 of the conjugated form "sucked" and the word address 75 of the adjacent word "dregs".

Accordingly, when using this type of index, the retrieval search result expected by the searcher may be obtained, whether the search word contained in the retrieval search criteria is in the original form or in the conjugated form.

Fifth Embodiment

Now a fifth embodiment in accordance with the present invention will be described in detail below. This embodiment is characterized in that the basal words are stored in the word storing part 1 with the class information of these basal words being tagged. In this example detailed description of the elements similar or identical to the preceding second embodiment will be omitted.

Figure 8:
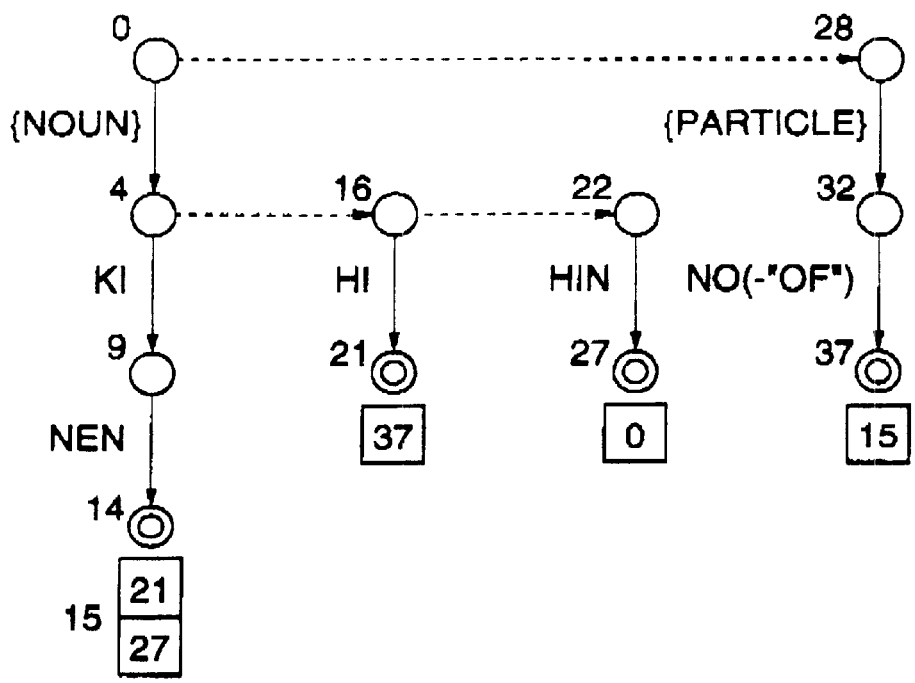
FIG. 8 is a schematic diagram showing one example of the index structure in accordance with a fifth embodiment of the present invention.

Now referring to FIG. 8, there is shown the structure of the index 1 which corresponds to the document containing "KINENBI NO KINENHIN (souvenir of anniversary)". Labels such as (noun) and (particle) are tags for indicating the class information of basal words.

With the word storing part 1 built in this manner, sub-trial may be performed for each class of word. This means that the word address range of the word of various classes may be defined.

For example, in the example shown in FIG. 8, the word address range of the noun is lying from 14 through 27, the word address range of the particle is lying from 37 through 38. When searching an adjacent word with the class information included in the retrieval search criteria, it will be sufficient for the document retrieval part 2 to check to see whether or not each adjacent word address is fallen in the word address range of the class corresponding to the retrieval search criteria. This process may be achieved by solely determining whether each adjacent word address is within an address range, so that faster document retrieval search may be performed.

It should be noted that the word storing part 1 in the present embodiment may be built by just storing the morpheme analysis results of documents without modification, since the word storing part 1 stores the class information. Also the conjugated and original forms obtained from the morpheme analysis may be just stored without modification if, as similar to the fourth embodiment, the conjugated and original form of words are stored as label.

Sixth Embodiment

Now a sixth embodiment in accordance with the present invention will be described in detail. The present embodiment has been made with the modification of the second embodiment described above, so that the elements similar or identical to preceding second embodiment will be omitted accordingly.

Figure 9:
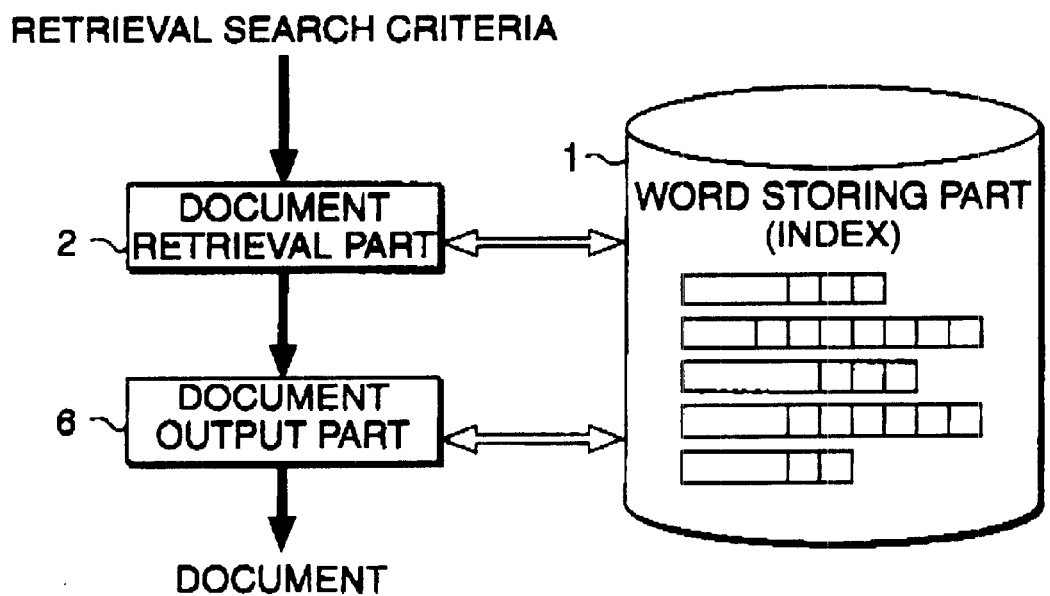
FIG. 9 is a block diagram showing a document retrieval apparatus in accordance with a sixth embodiment of the present invention.

Now referring to FIG. 9, there is shown a document retrieval apparatus in accordance with the present embodiment, in which a document output part 6 is added to the arrangement of the second embodiment.

The document output part 6 follows the adjacent word from the location matching to the retrieval search criteria in the index 1 to restore the text string from adjacent word addresses by using the words stored in the index 1, and to reconstruct and output the corresponding document.

More specifically, the concrete process of restoring a document from addresses will be described, by way of example, in the case of restoring the word in the address 28 from the word storing part 1 corresponding to the document containing "HIROENKAIJOGAI" as shown in FIG. 5.

When considering the top node of the word storing part 1, there are two transit paths from this top node. One of the paths is the path in the direction of depth following to the label "EN", the other is the path in the horizontal direction following to the node of the address 18 without label. The transit target of the former path is referred to as child node;

the target of the latter path is referred to as little brother node beneath the top node.

The address of the little brother node beneath the top node is 18. This indicates that the word following the child node of the top node terminates at the node in the address greater than 0 and less than 18. Thus it can be appreciated that the word in the address 28 to be required does not follow the child node of the top node.

Now considering the little brother node beneath the top node. When checking the little brother node beneath this node, in a manner similar to the above examination, the node address is 29. Thus it can be seen that the word in the address 28 follows at least a child node of the current node. Now moving to the child node, saving into memory the label "KAI" of transition, and checking to see the node at the address 23. This node has no little brother node. Then the address of its child node is 28. This value is greater than the target word address. Thus it can be seen that the target word may reside further away in this direction. Now moving to its child node and saving the label "JO" after the preceding label "KAI".

At this point the current node has neither a child nor a little brother node. As the current node is in terminated status and the address 29 is immediately after this node, it can be seen that the word corresponding to the current node is the target. As the sequence of stored labels is "KAI-JO", it can also be seen that the word corresponding to the current node is "KAIJO". In this way, the text string may be restored from the addresses in the trial form by using the document output part 6.

The process required for the restoration may be achieved at the computational cost approximately equal to the trial searching. The time required to restore respective words from the index to ultimately output the document may not be very long. In addition, in the present embodiment as similar to the preceding embodiments, the contents of document may be restored from the index 1 without having the context data of the document. The required amount of memory thereby will be significantly less than the full text retrieval search in the Prior Art.

To quantitatively present the effect of reducing the capacity of memory in accordance with the present invention, the comparison of the required capacity of memory in accordance with the present invention to that in the Prior Art will be provided on the subject of the same sample documents. The retrieval search apparatus of the Prior Art incorporates the character-based index in addition to the text.

The documents subjected to be retrieved in this experiment include six Published Unexamined Patent Applications randomly selected, with respective index of documents generated and with 2 bytes of word address length.

FIGS. 10 and 11 summarize the sizes in accordance with the present invention and the summary of sizes in accordance with the Prior Art technology, respectively.

When comparing the size shown in FIG. 10 with that in FIG. 11, the ratio of the required capacity to the based document is 0.17 in the present invention, and 1.14 in the Prior Art. The increased amount of required capacity is 1/6.7 of the Prior Art, yielding a significant effect.

Also, the size of indexes 1 is sufficiently small, approximately the same as the document sizes. For example, the Prior Art technology which may retrieve the word location information of word-by-word basis is considered here. The application of this Prior Art technology may allow the structure for restoring the document text without having the contents of the document similar to the present invention. To do this, it may be conceptually enough to additionally provide the index that can search and retrieve index addresses from the location of the word.

Figures 12, 13:
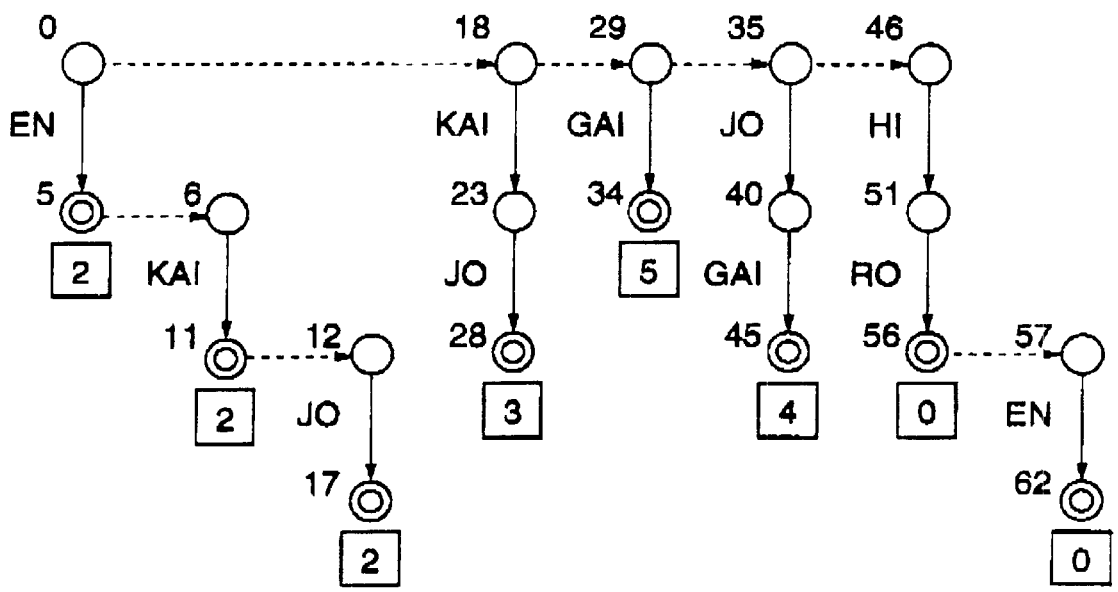
FIG. 12 is a schematic diagram showing an index structure.
FIG. 13 is a schematic diagram showing another index structure.

Now referring to FIGS. 12 and 13, there is shown the index 1 based on this concept with respect to the document containing "HIROENKAIJOGAI". FIG. 12 shows the index for retrieval search of a set of locations retrieved by a word, while FIG. 13 shows the index for retrieval search of word addresses retrieved by the location.

However, when comparing with this supposed method, the present invention does not require the index corresponding to the index shown in FIG. 13, so that the index of the present invention will be much smaller.

The contents of the index capacity in accordance with the present invention are shown in FIG. 14. From this table it may be seen that the capacity required for pointing to words consumes a larger portion of memory than the area for storing the words. As have been described above, in the present invention, the sequential order of words may be presented by storing the addresses of words next to the adjacent words. This allows the memory size required to point to words to be reduced as much as possible, yielding a significant effect when processing the actual documents, which may have a much larger quantity of words.

Seventh Embodiment

Now a seventh embodiment in accordance with the present invention will be described in detail. The elements similar or identical to second embodiment above will be omitted because the seventh embodiment is a modified version of the second embodiment, which performs retrieval search of the document containing the retrieval search criteria input from the searcher among a set of target documents to be searched.

Figure 15:
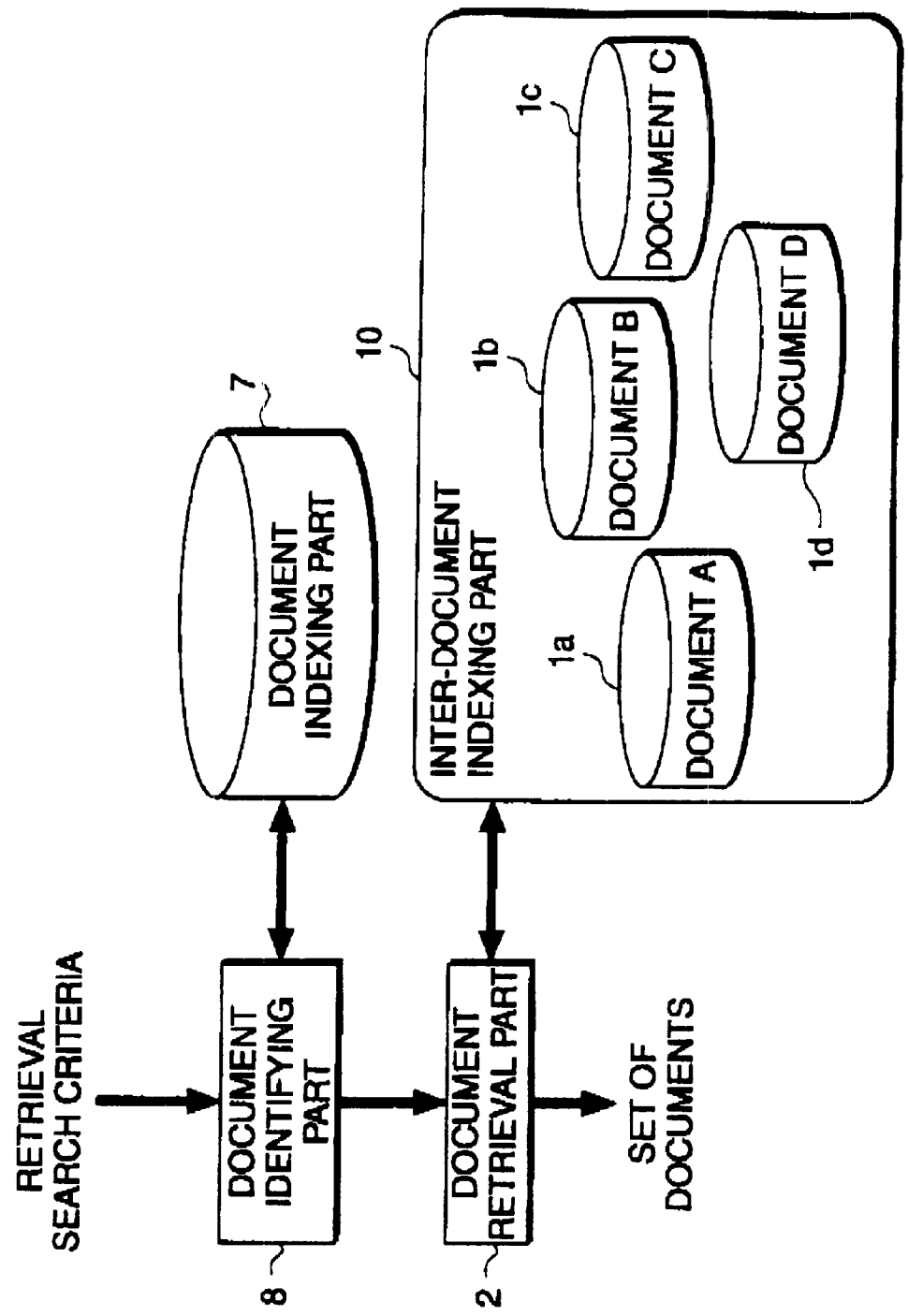
FIG. 15 is a block diagram showing a document retrieval apparatus of a seventh embodiment in accordance with the present invention.

Now referring to FIG. 15, there is shown a document retrieval apparatus in accordance with the present embodiment, which has a document indexing part 7, a document identifying part 8, and an inter-document indexing part 10 in addition to the document retrieval part 2.

The document indexing part 7 is a memory storing pointers to words and to a group of documents containing these words.

The document identifying part 9 upon reception of retrieval search criteria thereto uses the document indexing part 7 to identify a group of documents containing all of the words specified in the retrieval search criteria.

The inter-document indexing part 10 is a set of indexes 1a through 1d, generated for each of documents A through D, each index having the structure as described in the preceding embodiments.

In this embodiment, the document retrieval part 2 retrieves from the document identifying part 8 a set of documents containing all of the words specified as the retrieval search criteria. The resulting set of documents includes every document satisfying the criteria, referred to as candidate document hereinbelow.

The document retrieval part 2 then uses the indexes 1a through 1d corresponding to the candidate documents in the inter-document indexing part 10 to output one or more documents satisfying the sequence of words specified in the retrieval search criteria from within the candidates.

In accordance with the present embodiment, the target documents are narrowed prior to the retrieval search using indexes, allowing reducing the load of relatively time-consuming index search to yield totally faster retrieval search.

As have been described above, in accordance with the present invention, full text retrieval search with the relationship between words taken into consideration may be performed, without storing the full text of documents, by using only the index of relatively smaller capacity, on the documents not only in Indo-European languages but also in such a language as Japanese, which does not clearly articulate breakpoints between words, as well as the full text of documents resulting from the retrieval search may be output.

Also in accordance with the present invention, information on the word class and form such as conjugation may be stored in the index in less capacity, and such information may be collated faster. For example, in accordance with the present invention, the morpheme analysis results of documents may be stored in the index with a smaller capacity without modification so as to enable faster access from any arbitrary words to the index and the intended retrieval search.

What is claimed is:

1. A document retrieval apparatus that can determine whether a document matches retrieval search criteria, comprising;
    a word storing part that eliminates a redundancy with respect to every word contained in the document, and stores the words along with information concerning adjacent words adjoining to said words in said document;
    a document retrieval part that determines based on the retrieval search criteria containing a plurality of words and the sequential order thereof whether the plurality of words stored in said word storing part match said retrieval search criteria,
    wherein said word storing part stores said every word by identifying addresses in said word storing part, along with the adjacent words immediately after said words, and said word storing part stores, in a predetermined order, the addresses of the stored words next to the adjacent words as information with respect to said words to indicate the sequence of words in said document with the relationships between the addresses.

2. The document retrieval apparatus according to claim 1, wherein said word storing part stores said every word and said information concerning said word as an index in a trial form that records nodes in an ascending order of depth with a label of characters constituting the word on an arc connecting between said nodes.

3. The document retrieval apparatus according to claim 1, wherein said word storing part commonly stores the word and information concerning the word with respect to all of the words contained in a plurality of documents.

4. The document retrieval apparatus according to claim 1, wherein said word storing part stores two synonymous words, each having an original form and a conjugated form different from each other, by connecting the addresses thereof.

5. The document retrieval apparatus according to claim 1, wherein
    said word storing part stores a word tagged by its class information, and
    said document retrieval part determines, based on the retrieval search criteria further including the class information of the word, whether or not said plurality of words stored in said word storing part matches said retrieval search criteria.

6. A document retrieval apparatus that outputs a document matching retrieval search criteria, comprising:
    a word storing part that eliminates redundancy with respect to every word contained in a document, identifying the word with an address thereof, storing an adjacent word adjoining to said word in the document immediately after said word, adding to said words in a predetermined order the address storing an adjacent word next to the adjacent word to represent the sequence of words in the document by the relationships between the addresses;
    a document retrieval part that determines, based on the retrieval search criteria containing a plurality of words and a sequential order thereof, whether or not said plurality of words stored in said word storing part matches said retrieval search criteria; and
    a document output part that restores a full text of the document by outputting the plurality of matching words in the sequence of searched addresses.

7. A document retrieval apparatus that searches and retrieves a set of documents matching retrieval search criteria from within a group of documents, comprising:
    a document indexing part that stores information specifying a document and words contained in said document;
    a word storing part that eliminates redundancy with respect to every word contained in a document, identifying and storing the word with an address thereof, storing an adjacent word adjoining to said word in the document immediately after said word, adding to said words in a predetermined order the address storing an adjacent word next to the adjacent word to represent a sequence of words in the document by the relationships between the addresses, said word storing part performing on each of documents stored in said document indexing part;
    a document identifying part that identifies, based on the retrieval search criteria containing a plurality of words and a sequential order thereof, one or more documents containing all of the words contained in said retrieval search criteria from within a plurality of documents stored in said document indexing part; and
    a document searching part that searches and retrieves a set of documents matching said plurality of words and the sequence thereof contained in said retrieval search criteria from within a group of documents obtained from said document identifying part, by using said corresponding word storing part.

8. A computer-readable recording medium that stores an index for full text retrieval search of a document, comprising:
    said index comprising eliminating redundancy with respect to every word contained in a document, identifying and storing the word with the address thereof, storing an adjacent word adjoining to said word in the document immediately after said word, adding to said words in a predetermined order the address storing the adjacent word next to said adjacent word so as to represent the sequence of words in the document by the relationships between addresses; and
    a document retrieval part comprising a computer, determining, based on the retrieval search criteria containing a plurality of words and the sequential order thereof, whether or not said plurality of words stored in said word storing part matches said retrieval search criteria so as to output the appropriate matching document.

* * * * *